United States Patent
Shen

(10) Patent No.: US 7,924,358 B2
(45) Date of Patent: Apr. 12, 2011

(54) SPACER STRUCTURE OF A DISPLAY PANEL

(75) Inventor: Po-Yuan Shen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 45 days.

(21) Appl. No.: 12/203,130

(22) Filed: Sep. 2, 2008

(65) Prior Publication Data

US 2009/0237608 A1   Sep. 24, 2009

(30) Foreign Application Priority Data

Mar. 24, 2008  (TW) ................................. 97110387 A

(51) Int. Cl.
  *G02F 1/1339*   (2006.01)
  *G02B 6/1333*   (2006.01)
(52) U.S. Cl. ............................................. 349/55; 349/60
(58) Field of Classification Search .................. 349/155, 349/160

See application file for complete search history.

(56) References Cited

U.S. PATENT DOCUMENTS

| | | | |
|---|---|---|---|
| 6,181,406 B1 | 1/2001 | Morimoto | |
| 6,396,559 B1 * | 5/2002 | Kishimoto et al. | 349/156 |
| 6,803,715 B1 * | 10/2004 | Mitsutake et al. | 313/495 |
| 7,407,318 B2 * | 8/2008 | Chang | 362/632 |
| 7,511,794 B2 * | 3/2009 | Lin et al. | 349/156 |
| 7,626,654 B2 * | 12/2009 | Tsubokura et al. | 349/60 |
| 2002/0067450 A1 * | 6/2002 | Moriya | 349/129 |
| 2004/0012751 A1 * | 1/2004 | Iizuka et al. | 349/156 |
| 2005/0157245 A1 * | 7/2005 | Lin et al. | 349/155 |
| 2005/0190336 A1 * | 9/2005 | Chen | 349/155 |
| 2006/0066801 A1 * | 3/2006 | Liu et al. | 349/155 |
| 2006/0268214 A1 | 11/2006 | Chang | |
| 2007/0070285 A1 * | 3/2007 | Liu et al. | 349/156 |
| 2007/0091584 A1 * | 4/2007 | Chang | 362/29 |
| 2007/0115401 A1 * | 5/2007 | Tsubokura et al. | 349/58 |
| 2008/0061422 A1 * | 3/2008 | Han et al. | 257/686 |
| 2008/0123043 A1 * | 5/2008 | Li et al. | 349/156 |
| 2008/0204645 A1 * | 8/2008 | Kawabe et al. | 349/123 |
| 2010/0022155 A1 * | 1/2010 | Liu et al. | 445/24 |

FOREIGN PATENT DOCUMENTS

CN  1558269 A  12/2004

* cited by examiner

Primary Examiner — K. Cyrus Kianni
(74) Attorney, Agent, or Firm — Winston Hsu; Scott Margo

(57) ABSTRACT

A spacer structure of a display panel includes a first substrate, a second substrate, a spacer, and a spacer pad. The spacer is disposed on a side of the first substrate facing the second substrate, and the spacer pad is disposed between the second substrate and the spacer. The spacer pad has a non-linear structure lodged in the spacer, and therefore restrains the spacer from moving with respect to the second substrate in the plane parallel to the surface of the second substrate.

7 Claims, 7 Drawing Sheets

SPACER STRUCTURE OF A DISPLAY PANEL

BACKGROUND OF THE INVENTION

1. Field of the Invention

The present invention relates to a spacer structure of a display panel, and more particularly, to a spacer structure having anti-slip design.

2. Description of the Prior Art

A liquid crystal display (LCD) panel is mainly composed of a thin film transistor substrate (TFT substrate), a color filter substrate (CF substrate), and liquid crystal molecules filled therebetween. Spacers are disposed between the TFT substrate and the CF substrate in order to maintain a constant cell gap therebetween, so that dependable display quality can be ensured. Bead spacer, which is made of plastic material, is one type of conventional spacer structure. The bead spacers are spread randomly between the TFT substrate and the CF substrate to retain a constant cell gap. The haphazardly distributed bead spacers, however, may be located in display regions, and therefore cause incident light beams to scatter. The scattering of light beams leads to reduction of contrast ratio, whit point defect, color mura, etc., and therefore influences display quality and product yield.

To avoid the above defects of bead spacer, photo spacer made of photoresist has been commonly used recently. The pattern of photo spacers can be defined by a photolithography process because it uses photoresist as material. Accordingly, the size and location of the photo spacers can be precisely controlled. Please refer to FIGS. 1 and 2. FIG. 1 is a cross-sectional view of a conventional photo spacer, and FIG. 2 is a top view of a conventional photo spacer. As shown in FIG. 1, the conventional photo spacer 10 is between a TFT substrate 12 and a CF substrate 14, and an overcoat layer 16 is disposed between the photo spacer 10 and the CF substrate 14. The conventional photo spacer 10 is fabricated by coating a photoresist layer on the surface of the CF substrate 14 and the overcoat layer 16, and then performing an exposure and development process upon the photoresist layer to define the pattern of the photo spacer 10. The CF substrate 14 having the photo spacer 10 formed thereon is then bonded to the TFT substrate 12 with a sealant (not shown). The photo spacer 10 and the TFT substrate 12, however, are slightly in contact with each other, but not solidly secured. When the LCD panel is pressed or squeezed by an external force, the photo spacer 10 will slip with respect to the TFT substrate 12 as shown in FIG. 2. Since the photo spacer 10 is mounted on the CF substrate 14, the slipping of the photo spacer 10 also causes the CF substrate 14 to move relative to the TFT substrate 12. This leads to an alignment deviation between the CF substrate 14 and the TFT substrate 12, thereby generating display problems such as light leakage and abnormal display.

SUMMARY OF THE INVENTION

It is therefore one of the objectives of the present invention to prevent relative motion between the first substrate and the second substrate to improve display quality.

According to the present invention, a spacer structure of a display panel is provided. The spacer structure includes a first substrate, a second substrate, a spacer and a spacer pad. The second substrate is disposed opposite to the first substrate. The spacer is disposed on a side of the first substrate facing the second substrate. The spacer pad is disposed between the second substrate and the spacer. The spacer pad has a non-linear structure lodged in the spacer, and restrains the spacer from moving with respect to the second substrate in a plane parallel to a surface of the second substrate.

The spacer structure of the present invention includes a spacer pad with non-linear structure design, and the non-linear structure of the spacer pad is able to prevent relative motion between the first substrate and the second substrate of the display panel. Consequently, the display panel is free from light leakage or abnormal display problem.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
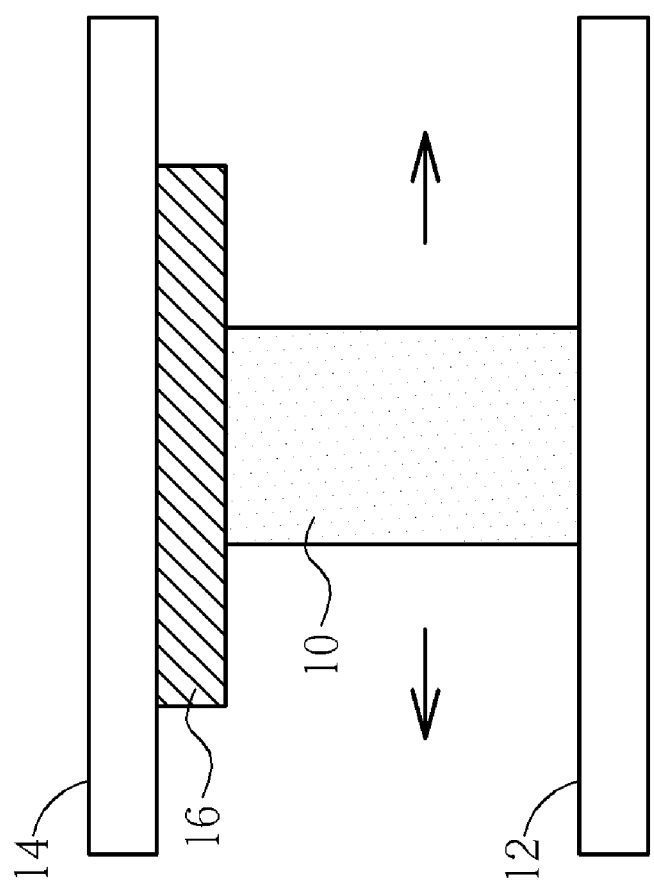
FIG. 1 is a cross-sectional view of a conventional photo spacer.
Figure 2:
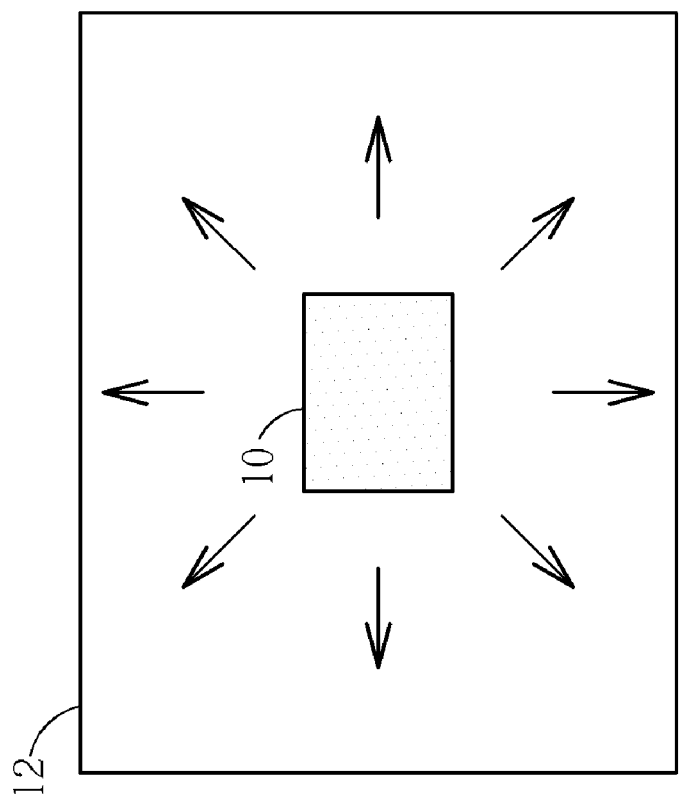
FIG. 2 is a top view of a conventional photo spacer.
Figure 3:
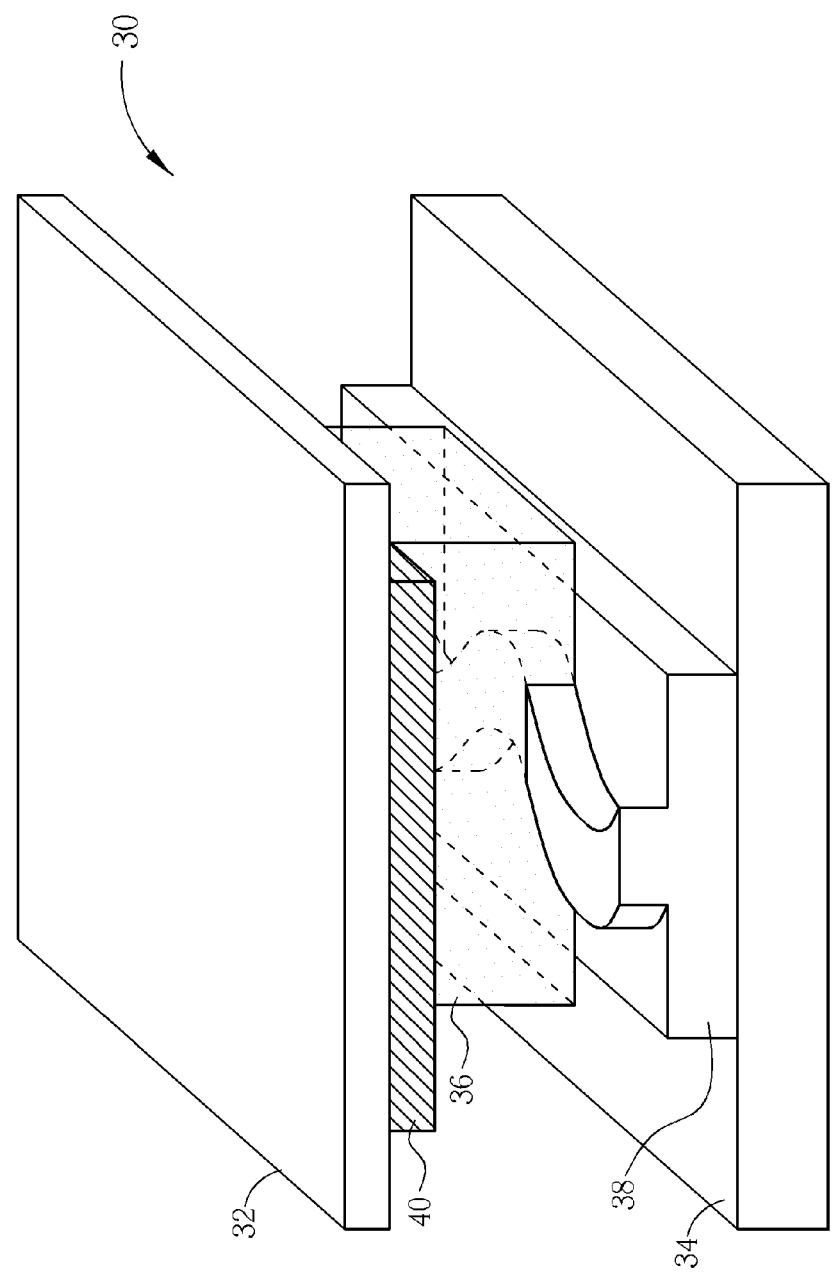
FIGS. 3-5 illustrate a spacer structure of a display in accordance with a preferred embodiment of the present invention.
Figure 4:
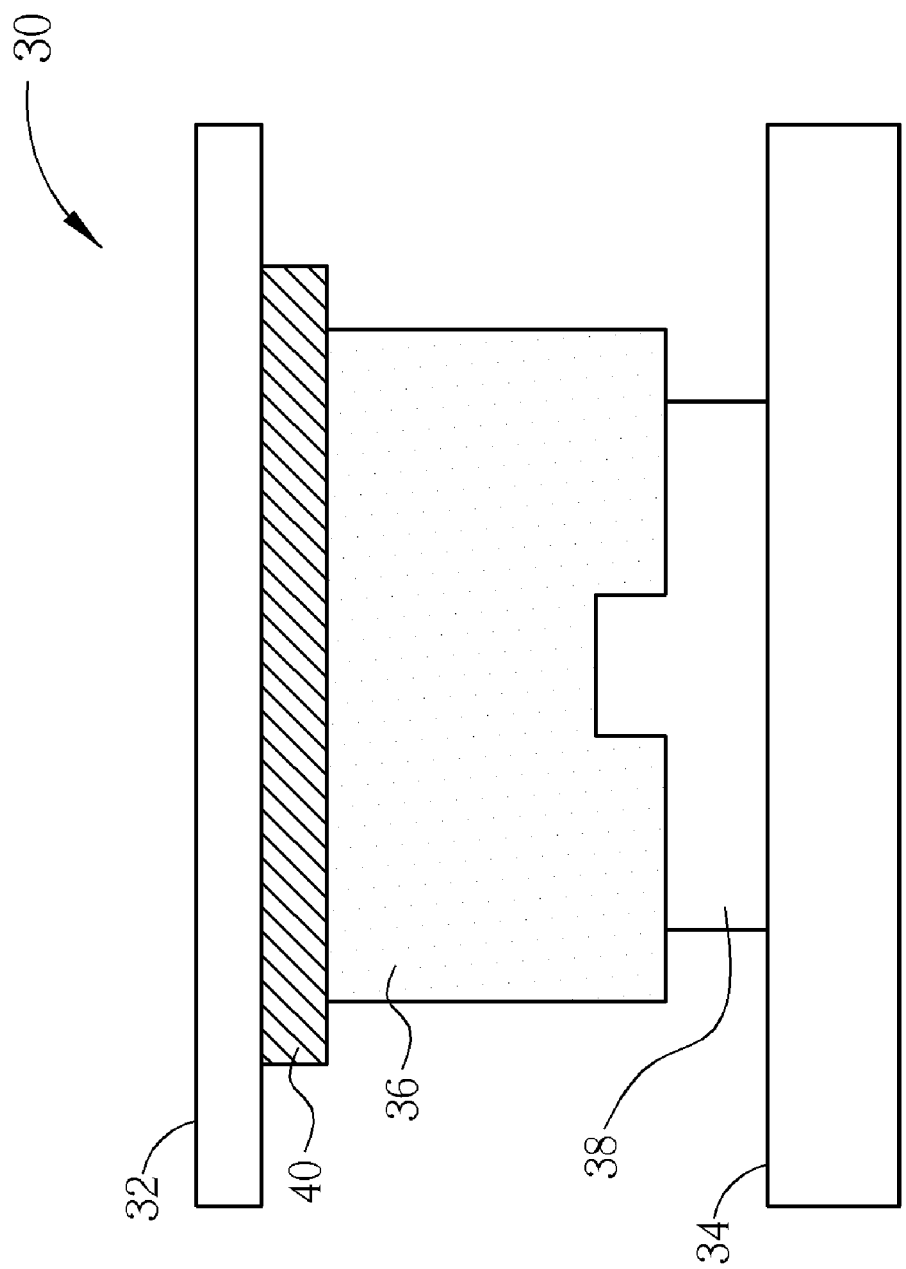
Figure 5:
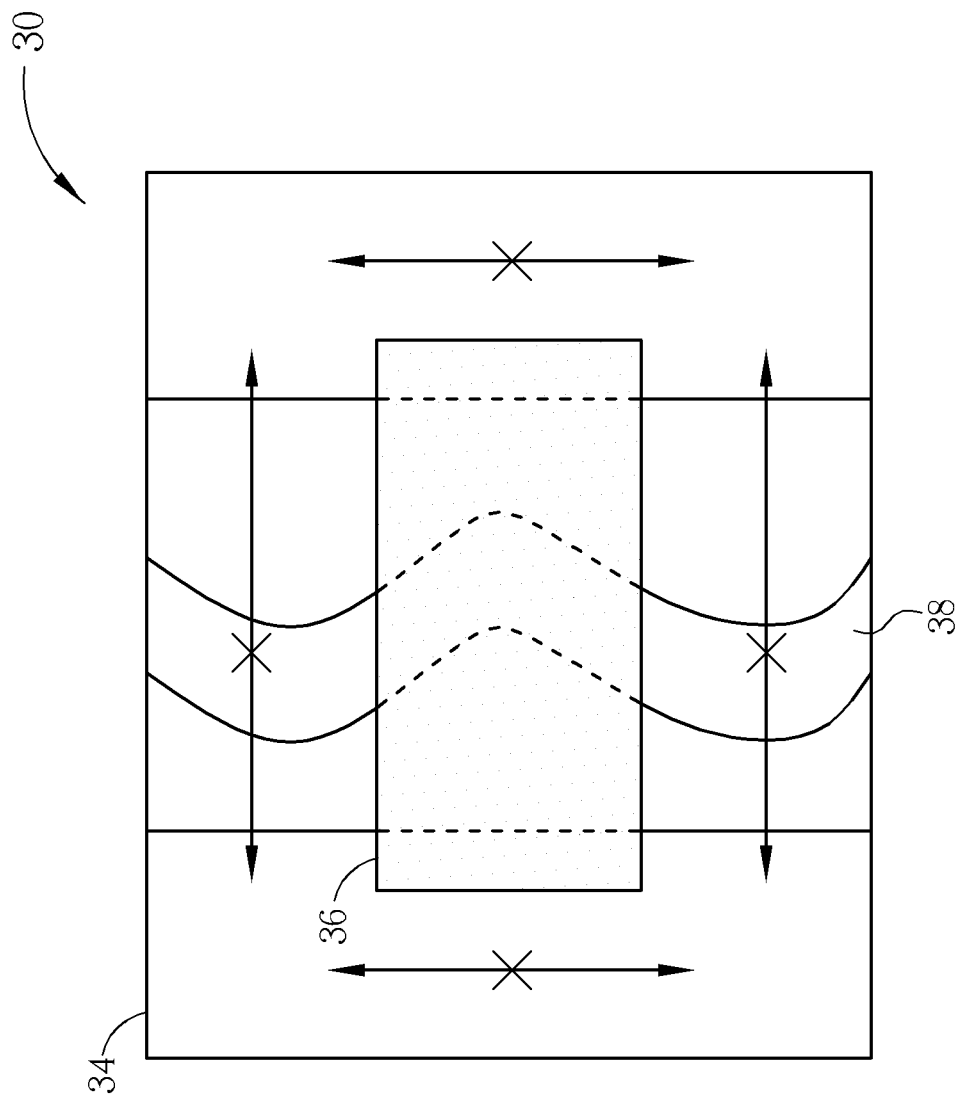

Please refer to FIGS. 3-5. FIGS. 3-5 illustrate a spacer structure of a display in accordance with a preferred embodiment of the present invention, where FIG. 3 is an oblique view, FIG. 4 is a cross-section view, and FIG. 5 is a top view; and some components are omitted in FIG. 4 in order to highlight the feature of the spacer structure of the present invention. As shown in FIGS. 3-5, the spacer structure 30 of display panel in the instant embodiment includes a first substrate 32, a second substrate 34 disposed opposite to the first substrate 32, a spacer 36 disposed on a side of the first substrate 32 facing the second substrate 34, and a spacer pad 38 disposed between the second substrate 34 and the spacer 36.

In this embodiment, the display panel includes an LCD panel, the first substrate 32 includes a CF substrate, the second substrate 34 includes a TFT substrate, and liquid crystal molecules (not shown) are filled between the first substrate 32 and the second substrate 34. The first substrate 32, however, may include a TFT substrate, and the second substrate 34 may include a CF substrate. The spacer structure 30 may further includes an overcoat layer 40, for instance a black matrix (BM) layer disposed between the first substrate 32 and the spacer 36, and the spacer 36 is fixed on the surface of the overcoat layer 40. To fulfill the overall structural strength requirement of the display panel, the material of the spacer 36 is preferably elastic material such as resin. Considering the process facility, the material of the spacer is preferably photosensitive material, which can be patterned by an exposure and development process to precisely control the size and location. Based on the above reasons, photo-sensitive resin is selected to be the material of the spacer 36 in this embodiment. The material of the spacer 36, however, is not limited and may be other suitable material.

The spacer pad 38 has a non-linear structure, such as a zigzag structure shown in FIG. 3, lodged in the spacer 36. As shown in FIG. 4, since the spacer pad 38 has a non-linear structure engaged into the spacer 36, the spacer pad 38 is able to restrain the spacer 36 from moving with respect to the second substrate 34 in the plane parallel to the surface of the second substrate 34. With the spacer pad 38 having the non-linear structure, any slip in the horizontal direction, the perpendicular direction or any other direction is limited. In addition, since the spacer 36 is mounted on the first substrate 32 and the spacer pad 38 is fixed on the second substrate 34, no relative motion will occur between the spacer 36 and the spacer pad 38. Accordingly, no relative motion will occur between the first substrate 32 and the second substrate 34. In such a case, the design of the spacer structure 30 of the present invention ensures that no relative motion can be generated between the first substrate 32 and the second substrate 34 when the display panel is pressed by an external force. Therefore, light leakage or abnormal display problem is avoided.

Figure 6:
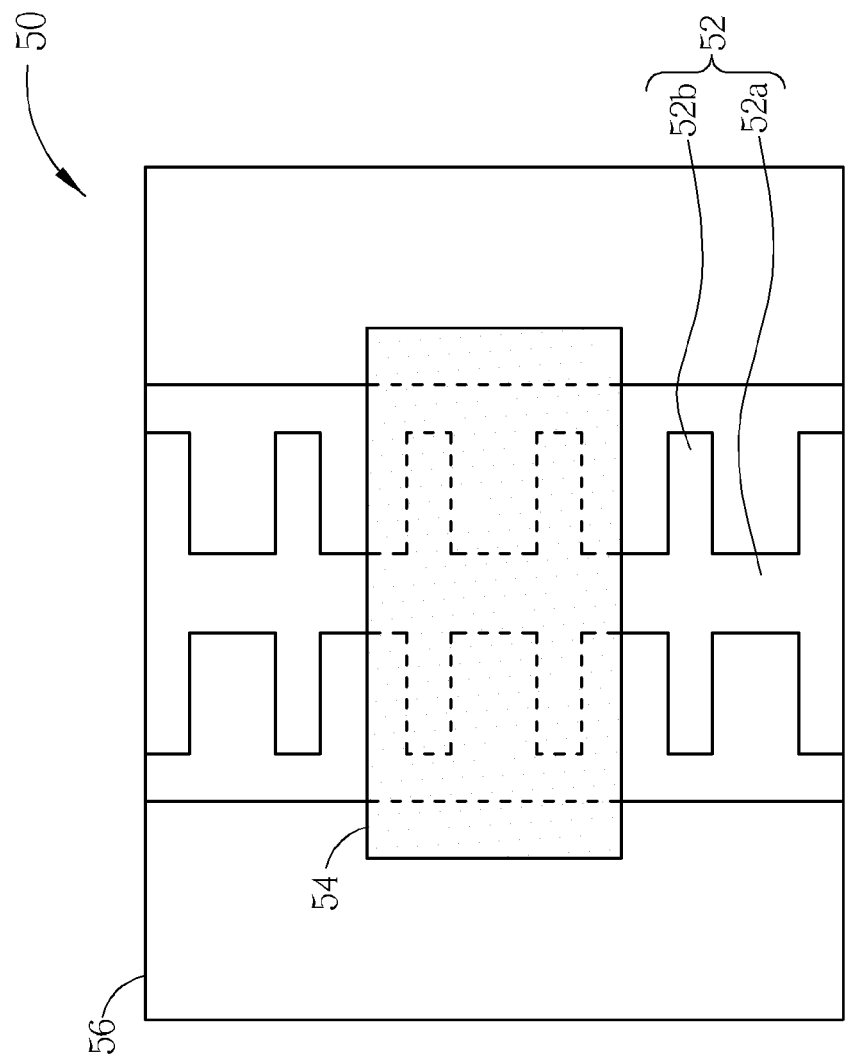
FIG. 6 illustrates a spacer structure according to another embodiment of the present invention.

The spacer structure of the present invention is not limited to the above embodiment, and can be modified according to other embodiments. In order to distinguish the difference between different embodiments, the following descriptions emphasize the critical and distinctive parts and similar parts are not redundantly repeated. Please refer to FIG. 6. FIG. 6 illustrates a spacer structure according to another embodiment of the present invention. As shown in FIG. 6, the spacer structure 50 includes a spacer pad 52 with a non-linear structure. This non-linear structure includes a trunk 52a, and a plurality of branches 52b structurally connected to the trunk 52a at one end and extending outwardly. In this embodiment, the trunk 52a is disposed along a first direction, and all the branches 52b is disposed along to a second direction perpendicular to the first direction. Similar to the above embodiment, the spacer pad 52 also lodges in the spacer 54. By virtue of the non-linear structure, the spacer pad 52 restrains the spacer 54 from shifting with respect to the second substrate 56. Consequently, no relative motion occurs between the first substrate (not shown in FIG. 6) and the second substrate 56.

Figure 7:
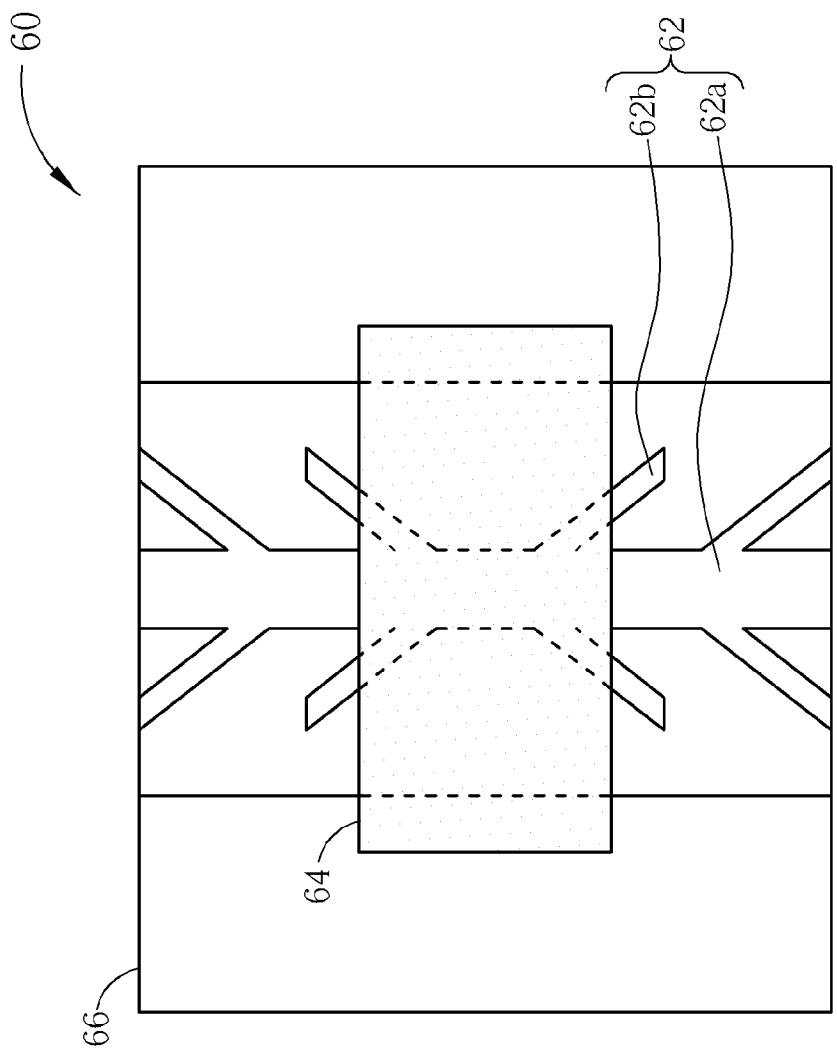
FIG. 7 illustrates a spacer structure of a display panel according to still another embodiment of the present invention.

Please refer to FIG. 7. FIG. 7 illustrates a spacer structure of a display panel according to still another embodiment of the present invention. As shown in FIG. 7, the spacer structure 60 of this embodiment has a non-linear structure including a trunk 62a, and a plurality of branches 62b structurally connected to the trunk 62a at one end and extending outwardly. Different from the above embodiment shown in FIG. 6, the trunk 62a is disposed along a first direction, at least a portion of the branches 62b are disposed along a second direction, and the first direction and the second direction are not perpendicular to each other in this embodiment. The spacer pad 62 also lodges in the spacer 64, and restrains the spacer 64 from shifting with respect to the second substrate 66 by virtue of the non-linear structure. Consequently, no relative motion occurs between the first substrate (not shown in FIG. 7) and the second substrate 66.

The non-linear structure of the spacer pad of the present invention is not limited by the aforementioned embodiments, and may be any non-linear structure such as various types of geometric structures or various types of discrete patterns that can prevent the spacer from moving in any direction in the plane parallel to the second substrate.

In conclusion, the design of the non-linear structure of the spacer structure is able to restrain relative motion between the first substrate and the second substrate of the display panel, and thus display quality can be assured.

Those skilled in the art will readily observe that numerous modifications and alterations of the device and method may be made while retaining the teachings of the invention.

What is claimed is:

1. A spacer structure of a display panel, comprising:
   a first substrate;
   a second substrate disposed opposite to the first substrate;
   a spacer disposed on a side of the first substrate facing the second substrate; and
   a spacer pad disposed between the second substrate and the spacer;
   wherein the spacer pad has a non-linear structure lodged in the spacer, and restrains the spacer from moving with respect to the second substrate in any directions in a plane parallel to a surface of the second substrate, and wherein the non-linear structure is a zigzag structure shaped along a plane parallel to the first substrate and the second substrate along a length of the first substrate and the second substrate.

2. The spacer structure of a display panel of claim 1, wherein the spacer structure comprises a photo-sensitive material.

3. The spacer structure of a display panel of claim 2, wherein the photo-sensitive material comprises photo-sensitive resin.

4. The spacer structure of a display panel of claim 1, further comprising an overcoat layer disposed between the first substrate and the spacer.

5. The spacer structure of a display panel of claim 4, wherein the overcoat layer comprises a black matrix layer.

6. The spacer structure of a display panel of claim 1, further comprising liquid crystal molecules filled between the first substrate and the second substrate.

7. A spacer structure of a display panel, comprising:
   a first substrate;
   a second substrate disposed opposite to the first substrate;
   a spacer disposed on a side of the first substrate facing the second substrate; and
   a spacer pad disposed between the second substrate and the spacer;
   wherein the spacer pad has a non-linear structure lodged in the spacer, and restrains the spacer from moving with respect to the second substrate in any directions in a plane parallel to a surface of the second substrate, and wherein the non-linear structure comprises a zigzag structure extending along one direction parallel to the surface of the second substrate.

* * * * *